3 Sheets—Sheet 1.

NATIONAL HAT POUNCING MACHINE CO.,

Assignee by mesne assignments of S. S. Wheeler & D. B. Manley.

MACHINES FOR POUNCING HATS.

No. 7,899. Reissued Oct. 2, 1877.

ATTEST.

Philip F. Larner

John B. Larner

INVENTORS.

National Hat Pouncing Machine Company

By Chas. E. Wood Atty.

3 Sheets—Sheet 2.

NATIONAL HAT POUNCING MACHINE CO.,

Assignee by mesne assignments of S. S. Wheeler & D. B. Manley.

MACHINES FOR POUNCING HATS.

No. 7,899. Reissued Oct. 2, 1877.

ATTEST.

Philip F. Larner

John P. Larner

INVENTORS.

National Hat Pouncing Machine Company

By Geo. H. Moore

Attorney

NATIONAL HAT POUNCING MACHINE CO.,
Assignee by mesne assignments of S. S. Wheeler & D. B. Manley.
MACHINES FOR POUNCING HATS.
No. 7,899. Reissued Oct. 2, 1877.
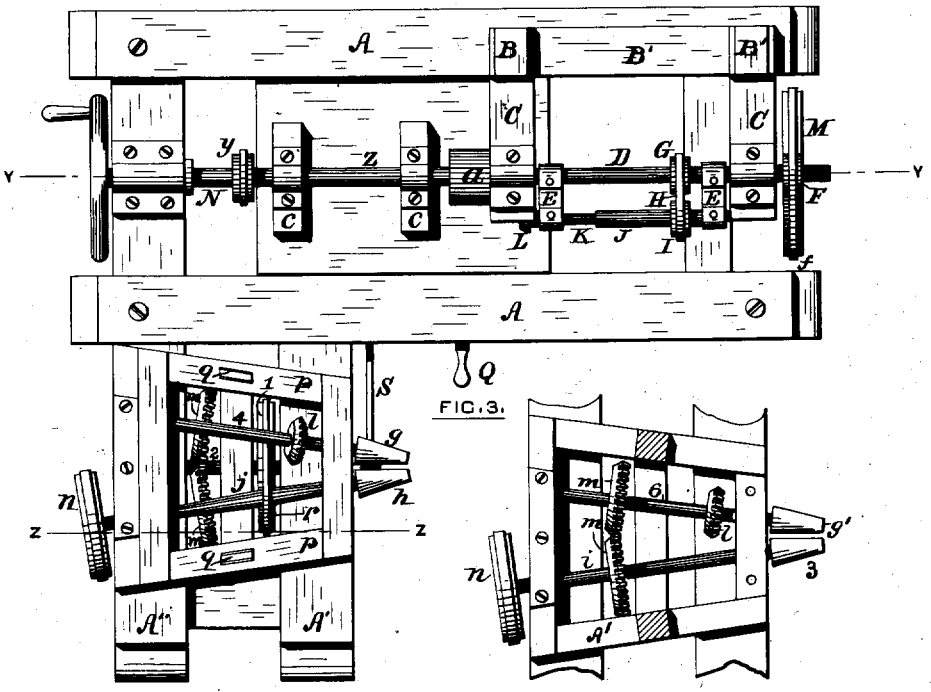
ATTEST.
Philip F. Larner
John B. Larner
INVENTORS.
National Hat Pouncing Machine Company
By Wm. C. Wood
Attorney

UNITED STATES PATENT OFFICE.

NATIONAL HAT POUNCING MACHINE COMPANY, OF NEW YORK, N. Y., ASSIGNEE, BY MESNE ASSIGNMENTS, OF SIDNEY S. WHEELER AND DANIEL B. MANLEY.

IMPROVEMENT IN MACHINES FOR POUNCING HATS.

Specification forming part of Letters Patent No. 57,232, dated August 14, 1866; Reissue No. 7,899, dated October 2, 1877; application filed August 1, 1877.

*To all whom it may concern:*

Be it known that SIDNEY S. WHEELER and DANIEL B. MANLEY, of Danbury, in the county of Fairfield and State of Connecticut, did invent certain new and useful Improvements in Machines for Pouncing Hats, which are fully, clearly, and exactly described in the following specification, reference being had to the accompanying three sheets of drawings, forming a part thereof, in which—

Figure 1:
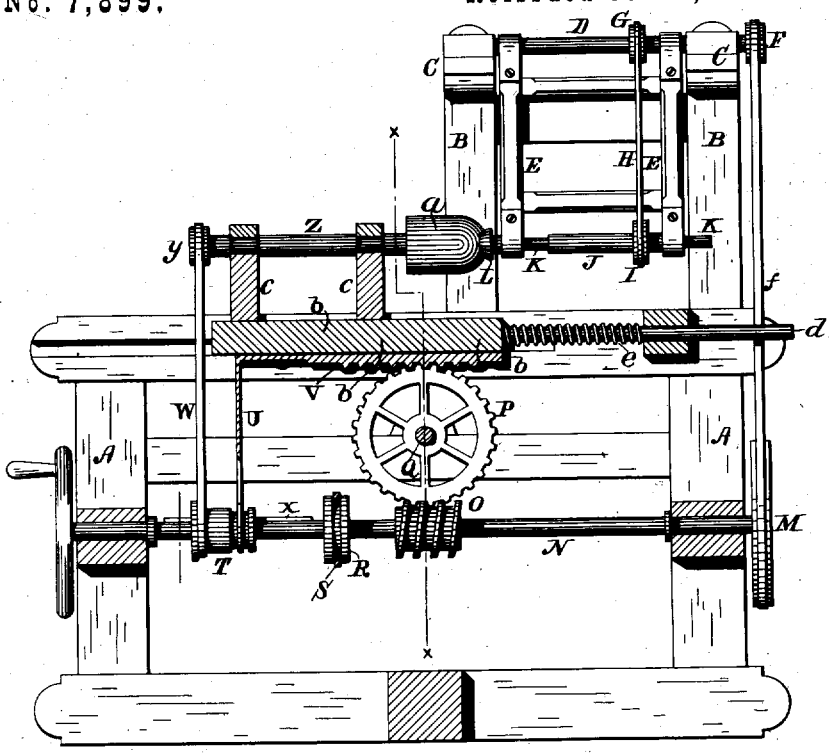
Figure 4:
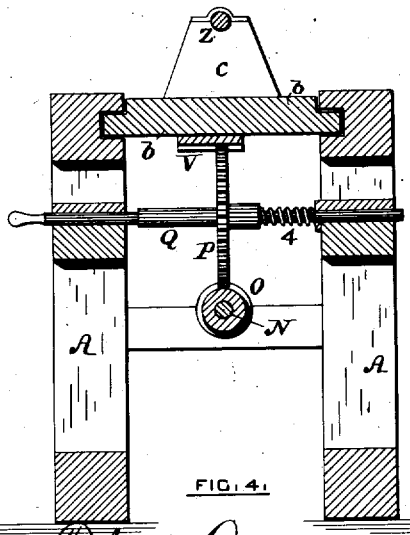
Figure 5:
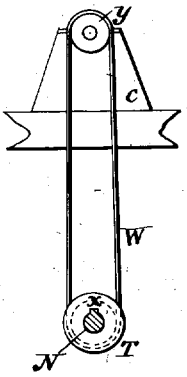
Figure 2:
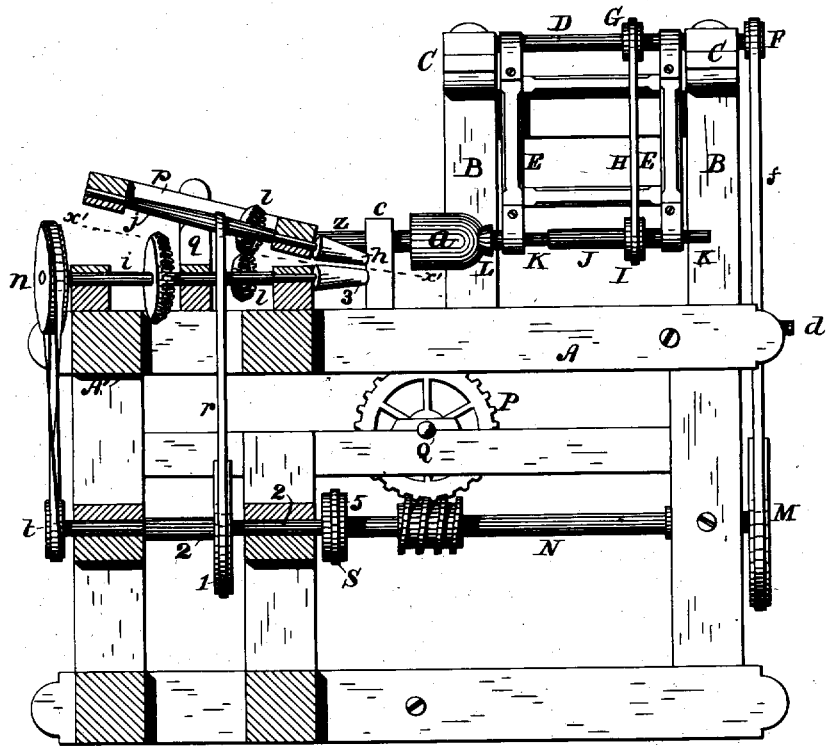

Figure 1, Sheet 1, represents a machine embodying the invention, in vertical section on line Y Y, Fig. 3. Fig. 2, Sheet 2, represents the same, partly in elevation and partly in vertical section, on line Z Z, Fig. 3. Fig. 3, Sheet 3, is a plan of the machine. Fig. 4, Sheet 1, is a transverse section on line X X, Fig. 1, looking toward the left hand. Fig. 5, Sheet 1, represents the main shaft in section, and also the end of the hat-block shaft, with the connecting-belt. Fig. 6, Sheet 3, is a plan of a portion of the machine at line X′, Fig. 2, with the parts above said line removed.

Similar letters of reference indicate corresponding parts.

The object of this invention is the pouncing of hats by mechanical means; and it consists, mainly, in the combination, with means by which a hat-body is supported and revolved or otherwise moved, of an emery-cylinder, or other pouncing-surface, moving at a high speed, whereby the hat is pounced while slowly moved, and maintained in contact with the pouncing-surface.

Said invention further consists in certain novel combinations of mechanism herein shown and described, and set forth in the claims appended to this specification.

Different portions of the frame of the machine are designated by letters A and A′. Each of these portions is composed of side pieces connected by cross-pieces. The two portions of the frame are so united that each is at right angles to the other, as shown in the plan, Fig. 3.

The main driving-shaft N, driven by a crank or other suitable means, is mounted on cross-pieces in the main portion A of the frame.

The shaft N is provided with a worm, O, which drives a cog-wheel, P, on a transverse shaft, Q, which projects at one end beyond the side of the frame, is capable of longitudinal movement, and is embraced by a spiral spring, 4, which forces the shaft and its gear toward the worm, as illustrated in Fig. 4.

The hat-block *a*, of any desired form, is mounted at the end of a shaft or spindle, Z, which has its bearings upon standards *c c* on a sliding carriage, *b*, having on its under side a rack-gear, V, which, normally, is in gear with the cog-wheel P. The sliding carriage has also projecting from its front end a spindle, *d*, within a spiral spring, *e*, which forces the carriage rearward whenever the cog P is disengaged from the rack and worm. This disengagement is effected by forcing the cog-shaft Q toward its spring. At the rear end of the carriage *b* is a pendent arm, U, which is forked, and at its lower end occupies an annular groove in pulley T, which is rotatively connected by a feather, *x*, to shaft N, and is free to slide thereon with the carriage, and therefore said pulley is enabled, by its band W and the pulley *y*, to rotate the hat-block spindle during the entire movement of the carriage. The main portion A of the frame has two strong standards, B B, having at their tops brackets C, which project horizontally, and afford bearings for a shaft, D, on which a hanging frame, E, is hinged.

The emery cylinder or wheel L is mounted on a shaft or spindle, J, in bearings at the lower end of the frame E, and it is rapidly driven by a band, H, from pulley G on shaft D, which is in turn driven by a band, *f*, a pulley, F, and a larger pulley, M, on the main shaft N.

The spindle J has journals K, which permit it to move endwise in its bearings for a short distance, as occasion requires.

The pouncing cylinder or wheel L is covered with emery or its equivalent, in any suitable manner.

The mechanism thus described pounces the tip and side crown of a hat-body. The brim thereof is pounced in another portion of the machine, by mechanism next described, which is mounted in the portion of the frame designated by A′. The conical roll *h* is covered with emery or equivalent material, and it is mounted on a spindle, *j*, above a similar spindle, *i*, which has at its end, beneath the emery-roll *h*, a conical roll, 3, as in Fig. 2.

The upper and lower feed-rolls are shown, respectively, at *g* and *g′*, both being conical, and roll *g′* having a surface of india-rubber or other suitable elastic material. The spindles *i* and 6 of rolls 3 and *g′* are horizontal, and occupy bearings on top of the frame at A′. They are set angularly on said frame, so that the rolls are adjacent to each other, and the rear ends of the spindles more widely separated, as shown in Fig. 6.

The spindles *j* and 4, which carry, respectively, the emery-cylinder *h* and feed-roll *g*, are exactly above spindles *i* and 6, respectively, as shown in Fig. 3; but they are mounted in an upper frame, *p*, which is pivoted on vertical standards *q* on the frame A′, so that the emery cylinder and roll *g* may be moved upward from the rolls beneath them.

When in working position the upper spindles are so inclined that the coincident surfaces of the upper and lower cones are parallel.

The emery-roll *h* is driven from shaft 2 by pulley 1 and elastic band *r*, passing over spindle *j*, which is tapered each way from the middle, and is fitted to serve as a pulley, as shown in Fig. 2. The rolls 3, *g′*, and *g* are driven by means of a pulley, *t*, on shaft 2, in frame A′, a band passing from thence over pulley *n* on spindle *i*, and two sets of gears, as at *m* and *l*, as clearly shown in Figs. 2, 3, and 6. The shaft 2 is parallel with shaft N, and is driven thereby through pulleys R and 5 and belt S, as shown in Figs. 1, 2, and 3.

Those shafts and spindles which are described as being driven by bands and pulleys may be driven in any other suitable manner.

The operation of the machine is as follows: A hat-body is placed on block *a*, and power applied to the machine. The operator controls with his hand the hanging frame in which the emery-cylinder is mounted, so as to cause said cylinder, while rotating at high speed, to operate on either side of the hat-block at pleasure. The spindle J may be provided with a spiral or other spring, or other suitable device, for forcing the emery-cylinder toward the hat-block. The hat-block is, meantime, rotated at a comparatively slow speed, and these movements of the emery cylinder or wheel and the hat-block will cause said cylinder or wheel to pounce the crown of the hat-body before the worm O has had time to move the carriage *b* sufficiently forward to bring the side of the block opposite the emery-cylinder, which may be properly called the cutting-cylinder. The block is advanced slowly, to allow the emery or cutting cylinder to act upon the tip and side crown. When the hat is thus far pounced the operator pushes shaft Q toward its spring, which disengages cog-wheel P from the worm and the rack on the carriage, whereupon the latter is forced backward by means of its spring *e* on rod *d*, the sliding pulley T being carried along its shaft by the pendent arm U. The hat-body being removed from the block, its brim is then pounced, as follows: The operator slightly raises the front end of frame *p*, in which are mounted the spindles of emery-roll *h* and feed-roll *g*, and, after inserting the brim of the hat between them and rolls 3 and *g′*, releases the frame, whereupon the feed-rolls engage with the brim, rotate the hat, and, while thus moving between the emery-cylinder and the supporting-roll, the brim is pounced in a perfect manner.

The conical shape of the rolls causes the edge of the brim to move at greater speed than the inner portion thereof. After one side of a brim has been pounced, the other side is operated upon in like manner.

The devices for pouncing the body of the hat and the brim are independent of each other, although mounted in the same or connected frames; and as soon as a hat-body is removed from block *a*, another can be placed thereon.

This invention can also be applied to shaving hat-bodies before they are blocked.

The same results can be attained by causing the emery or pouncing surface to be reciprocated after the manner of a "jigger-motion," instead of being rotated, the hat-body being likewise reciprocated, and also rotated, so as to present continually a fresh surface to the pouncing-surface, or else being merely rotated on an advancing carriage.

Having thus described this invention, what is claimed as new, and desired to be secured by these Letters Patent, is—

1. The combination, with a hat-block and gearing for driving it at a low speed, of a pouncing-cylinder or its equivalent, and gearing for driving it at a high speed, substantially as described.

2. The combination of a rotating cutting cylinder or wheel for pouncing hats with a vibrating frame, substantially as described, whereby said cutting cylinder or wheel can be made to operate both on the crown and side of a hat-body, substantially as set forth.

3. The combination, with pouncing mechanism, of a rotating hat-block, which is also capable of movement in the line of its axis, substantially as described.

4. The combination, with a rotating hat-block which has also a movement in the line of its axis, of a rapidly-revolving pouncing-cutter which has also a movement in the line of its axis, substantially as described.

5. The combination of a slowly-revolving hat-block, a carriage for supporting the block and moving it in the line of its axis, a worm-gear, cog-wheel, and rack for moving the carriage forward, mechanism for disconnecting the gearing, and a spring for moving the carriage backward, substantially as described.

6. The combination, with feeding mechanism for slowly rotating a hat-body, of a rapidly-operated pouncing-surface and a support for the hat-body, substantially as described.

7. The combination, with feeding mechanism for slowly rotating a hat-body, of a rapidly-operated pouncing-surface and a support for the hat-body, the said pouncing-surface and support being separable for the insertion of the hat-body, substantially as described.

8. The combination, with a rapidly-rotating pouncing-roller, of a slowly-rotating roller for supporting the hat, substantially as described.

9. The combination of a conical rotating pouncing-surface and a conical supporting-surface, to hold the brim of a hat to the cutting-surface, substantially as described.

10. The combination, with a rotary cutting-surface for pouncing the brims of hat-bodies, of rolls for feeding a brim to the cutting or pouncing surface, substantially as described.

NATIONAL HAT POUNCING MACH. CO.,
By ED. A. NICHOLS, *Prest.*

Witnesses:
R. EICKEMEYER,
G. OSTERHELD.